United States Patent [19]

Yoshino

[11] Patent Number: 4,887,124
[45] Date of Patent: Dec. 12, 1989

[54] BELT COLOR FILTERS IN AN IMAGE RECORDING APPARATUS

[75] Inventor: Shigeru Yoshino, Kanagawa, Japan

[73] Assignee: Fuji Photo Film Co., Ltd., Kanagawa, Japan

[21] Appl. No.: 182,818

[22] Filed: Apr. 18, 1988

[30] Foreign Application Priority Data

Apr. 16, 1987 [JP] Japan .................................. 62-92067

[51] Int. Cl.$^4$ ........................ G03B 27/32; G03B 27/52
[52] U.S. Cl. ......................................... 355/32; 355/71
[58] Field of Search ...................... 355/32, 35, 38, 71

[56] References Cited

U.S. PATENT DOCUMENTS

| | | | |
|---|---|---|---|
| 3,813,160 | 5/1974 | Nowak | 355/71 |
| 4,193,679 | 3/1980 | Mochizuki et al. | 355/71 |
| 4,232,962 | 11/1980 | Sauer | 355/71 |
| 4,641,944 | 2/1987 | Honda et al. | 355/71 |

Primary Examiner—Monroe H. Hayes
Attorney, Agent, or Firm—Sughrue, Mion, Zinn, Macpeak & Seas

[57] ABSTRACT

In an image recording apparatus in which an original is optically read and recorded on a photo-sensitive material, a multi-lens array is provided in the section reading the original. A belt-shaped color and density correcting filer consisting of a plurality of filter elements of differing colors and densities is movably disposed between the multi-lens array and the photo-sensitive material so that a desired one of the filter elements is positioned in the optical path of the multi-lens array.

4 Claims, 2 Drawing Sheets

BELT COLOR FILTERS IN AN IMAGE RECORDING APPARATUS

BACKGROUND OF THE INVENTION

1. Field of the Invention

This invention relates to image recording apparatus such as heat-sensitive copying machines, pressure-sensitive copying machines, electrophotographic copying machines and diffusion transfer type copying machines. The invention more particularly relates to the correction of color and density in an original reading section in such an apparatus.

2. Background of the Invention

In a conventional image recording apparatus of this type a transmission type lens is provided in its section that reads the original. A flat-plate-shaped filter is disposed near the focal point of the lens. On the other hand, recently a multi-lens array has been employed as the optical system in order to meet a demand for miniaturizing the copying machine. A density filter has been disclosed in Japanese Patent Application Publication No. 37535/1983 which can be used as a filter for the multi-lens array.

On the other hand, in the case where a color copier uses only one color density filter, it is impossible to achieve color correction with high accuracy. Accordingly, the coloring is frequently not natural and the resultant copy is subtly different in color from the original.

For the accurate correction of color density, it is essential that a number of color correcting filters of different densities be employed. At least two of the different color correcting filters must be matched with each other for the proper combination of the three primary colors.

The color correcting filters must be placed in such a manner as to cover the entire width of an exposure or reading lens. Therefore, in the case in which flat glass filters are used, it is difficult in a mechanical sense to move them in the narrow space in the copying machine when they are being replaced. Heretofore, it has been considered substantially impossible to do so. In the case of a multi-lens array, the focal length is so short that it has been considered extremely difficult to provide a filter mechanism in the narrow space between the multi-lens array and the photo-sensitive material.

SUMMARY OF THE INVENTION

Accordingly, an object of this invention is to eliminate the above-described difficulties accompanying a conventional image recording apparatus.

More specifically, an object of the invention is to provide an image recording apparatus in which color correction is achieved with high accuracy and the resultant copy is therefore of excellent quality.

The foregoing object and other objects of the invention have been achieved by an image recording apparatus in which an original image is recorded on a photo-sensitive material by optical exposure. According to the invention, the image recording apparatus comprises a multi-lens array provided in an original reading section and a belt-shaped color and density correcting film filter between the multi-lens array and the photo-sensitive material. The filter is moved by a filter moving mechanism.

The nature, principle and utility of the invention will become more apparent from the following detailed description when read in conjunction with the accompanying drawings.

DETAILED DESCRIPTION OF THE PREFERRED EMBODIMENTS

Figure 1:
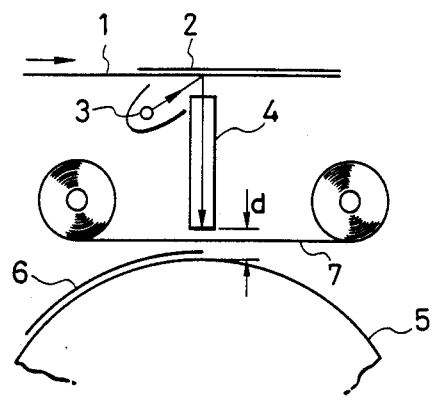
FIG. 1 is an explanatory diagram showing a first example of an image recording apparatus according to this invention.

The photo-sensitive material employed in the invention may be a photo-sensitive drum having a photo-sensitive layer, or a sheet-shaped photo-sensitive material. Other photo-sensitive materials are possible.

In the case where the image recording apparatus of the invention is a pressure-sensitive copying machine, it uses a photo-sensitive material which is subjected at a minimum to pressure. One example of the photo-sensitive material has been disclosed in Japanese Patent Application (OPI) No. 170936/1982 (the term "OPI" as used herein means an "Unexamined Published Application"). It is made up of a support and a layer of synthetic macromolecular resin wall capsules formed on the support which contain a vinyl compound, a photo-polymerization starter, and a coloring agent precursor. To record an image on the photo-sensitive material, an optical exposure forms a latent image on the photo-sensitive material so that the microcapsules are selectively hardened according the the light distribution of the image. The photo-sensitive material thus treated is subjected to pressure so that the microcapsules which have not been hardened as yet are broken to thereby discharge the coloring agent precursor to provide a colored image. The method is advantageous in that images of high picture quality can be obtained by simple dry treatment.

A novel photo-sensitive material of high photo-sensitivity which can provide an image of high picture quality by simple dry treatment has been disclosed in Japanese Patent Application (OPI) No. 275742/1986, filed by the present inventor. The photo-sensitive material is formed by coating a support with at least photo-sensitive silver halogenide, reducing agent, polymerizing compound and color image forming material. At least the polymerizing compound and the color image forming material are contained, in combination, in microcapsules.

An image recording method using the above-described novel photo-sensitive material has been disclosed in Japanese Patent Application (OPI) No. 278849/1986, filed by the present inventor. In this method, a latent image is formed on the photo-sensitive material through optical exposure, and then the photo-sensitive material is heated so that, in the region of the latent image, the polymerizing compound is polymerized to produce macromolecular compound to thereby harden the microcapsules. Thereafter, the photo-sensitive material is laid on an image receiving material having an image receiving layer onto which the color image forming material can be transferred. As a result, in the region where no latent image is formed, the microcapsules are at least partially broken so that they transfer the color image forming material onto the image receiving material to obtain the visible image on it.

One type of an image recording apparatus using the above-described photo-sensitive material automatically performs the steps of optically exposing the photo-sensitive material and thermal developing it. The apparatus then piles it on the image receiving material and thermally transfers the image from one to the other so that an image having a desired density or color density is formed on the image receiving material. This type of image recording apparatus has been disclosed in Japanese Patent Application No. 287492/1985, filed by the present inventor.

In the invention, the term "multi-lens array" is intended to mean a focusing light transmission array which is formed as follows. Bar lens are characterized by their refractive index changing continuously in cross-section like a parabola extending outwardly from the center of the respective bar lens. The bar lenses are linearly connected to one another and are then enclosed in a housing. The opposite axial ends of the bar lenses face respectively the original and the photo-sensitive material.

In the image recording apparatus of the invention, a belt-shaped color and density correcting film filter is interposed between the multi-lens array and the photo-sensitive material, as described later. The filter is made up of a number of filter elements for yellow, magenta and cyan or gray density correction. Each element is made of a polyethylene film 50 μm to 100 μm in thickness and having a length corresponding to that f the multi-lens array and a width W corresponding to that of the multi-lens array.

In the same recording apparatus of the invention, the filter disposed between the multi-lens array and the photo-sensitive material is moved by a mechanism of, for instance, drive motors so that a selected one of the filter elements is positioned in the optical path of the entire multi-lens array. For this purpose, each of the filter elements has a position detecting hole or bar code. The filter moving mechanism has a sensor for detecting this hole or bar code.

Now, preferred embodiments of this invention will be described with reference to the accompanying drawings.

In a first example of an image recording apparatus according to the invention, as shown in FIG. 1, an original 2 is placed on an original supporting stand 1 and is moved to the right while being illuminated by a lamp 3. As a result, light reflected from the original 2 is transmitted through a multi-lens array 4 to a photo-sensitive material 6 provided on a rotating exposure drum 5. In this operation, a color correcting filter 7 is disposed in a narrow gap of thickness d between the multi-lens array 4 and the photo-sensitive material 6. In this example the filter 7 is laid in parallel with the direction of movement of the photo-sensitive material. However, it may be laid in a direction perpendicular to the direction of movement of the photo-sensitive material as shown in FIG. 2.

Figure 2:
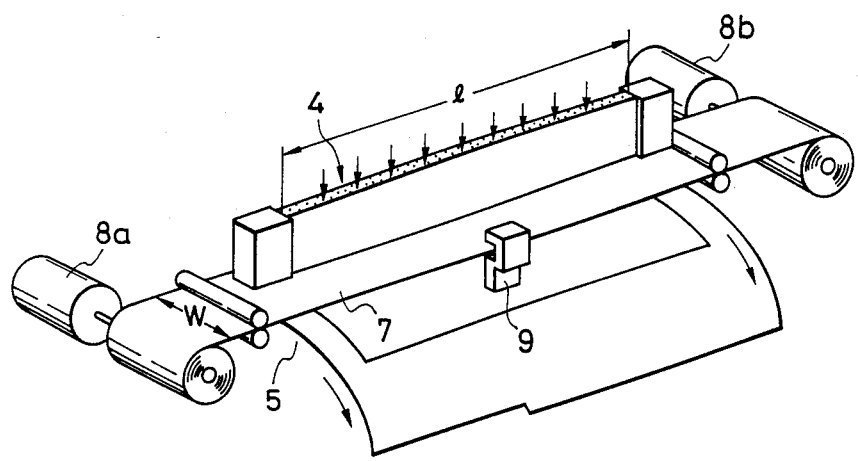
FIG. 2 is a perspective view showing a second example of the image recording apparatus of the invention.
Figure 3:
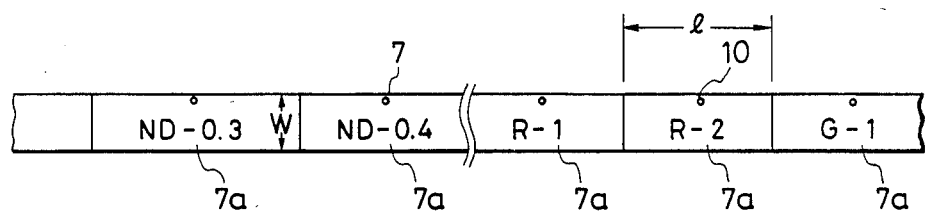
FIG. 3 is an explanatory diagram showing a color correcting filter employed in the image recording apparatus of the invention.

FIG. 2 shows another example of the image recording apparatus according to the invention. In the apparatus, as was described above, the color correcting filter 7 is laid in the direction perpendicular to the direction of movement of the photo-sensitive drum 5. The color correcting filter 7 can be moved both right and left by means of drive motors 8a and 8b until a desired color correcting filter element comes just below the multi-lens array 4. As shown in FIG. 3, each color correcting filter element 7a has a position detecting hole 10 at its center. The apparatus of FIG. 2 further comprises a position detecting sensor 9 which is so positioned that, when it detects the position detecting hole 10, the color correcting filter element is precisely positioned below the multi-lens array 4.

As shown in FIG. 3. the color correcting filter 7 consists of a plurality of different color correcting filter elements 7a which are each of length l and width W and have the above-described position detecting hole 10 at the center. For use with the embodiment of FIG. 2, the length l of the filter elements 7a is approximately equal to the active length of the multi-lens array 4 and its width W is at least equal to the width of the multi-lens array 4. As illustrated, the different filter elements have different colors (G, R, and ND (gray)) and different densities.

Figure 4:
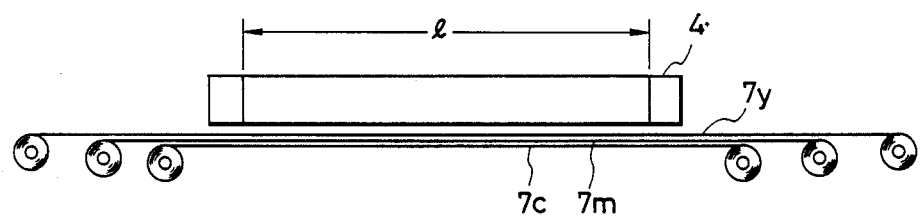
FIG. 4 is an explanatory diagram showing three color correcting filters of the invention which are arranged in the image recording apparatus.

FIG. 4 shows another example of the image recording apparatus of the invention in which three color-correcting filters and associated moving mechanism are provided. For instance, a yellow filter 7y, a magenta filter 7m and a cyan filter 7c are selectively set below the multi-lens array 4. The filters 7h, 7m and 7c are divided into filter elements 7a of different densities. In general, with the color as a reference to which the photo-sensitive material is least sensitive. the other two colors are corrected for color balance. In this case, the colorless part of one color correcting filter for the least sensitive color is positioned adjacent colored parts of the other two color correcting filters of the desired densities.

As is apparent from the above description, in the image recording apparatus in which an original is read and recorded on a photo-sensitive material through optical exposure, the multi-lens array is provided in the original reading section. The belt-shaped color and density correcting filter is movably positioned between the photo-sensitive material and the multi-lens array by the filter moving mechanism. Because the color correcting filter can be arranged between the multi-lens array and the photo-sensitive material in the above-described manner, the color correction can be achieved with high accuracy, and, therefore, the resultant image has excellent picture quality.

Furthermore, in the invention, the filter is in the form of a belt-shaped film. Therefore, even three filters can be arranged in the narrow space between the multi-lens array and the photo-sensitive material. This space is not greater than 20 mm because of the focal length of the multi-lens array.

What is claimed is:

1. An image recording apparatus in which an original is read and recorded on a photo-sensitive material through optical exposure, comprising:
   a multi-lens array having a receiving end adjacent an original to be read and a transmitting end adjacent a photo-sensitive material to be recorded;
   a belt-shaped color and density correcting film filter provided between said transmitting end of said multi-lens array and said photo-sensitive material, said film filter having a plurality of filter elements of different colors; and a filter moving mechanism for moving said filter perpendicularly to a transmission path of light through said multi-lens array.

2. An apparatus as claimed in claim 1, wherein different ones of said filter elements of one of said different colors being of different optical densities.

3. An apparatus as claimed in claim 1, wherein said filter moving mechanism comprises means for positioning a selected one of said filter elements adjacent said multi-lens array.

4. An apparatus as claimed in claim 3, wherein said filter elements each have position identifiers disposed at corresponding predetermined positions and said filter means includes a detector for detecting said identifiers.

* * * * *